H. BALDWIN.
Fly-Wheel.
No. 211,685.     Patented Jan. 28, 1879.
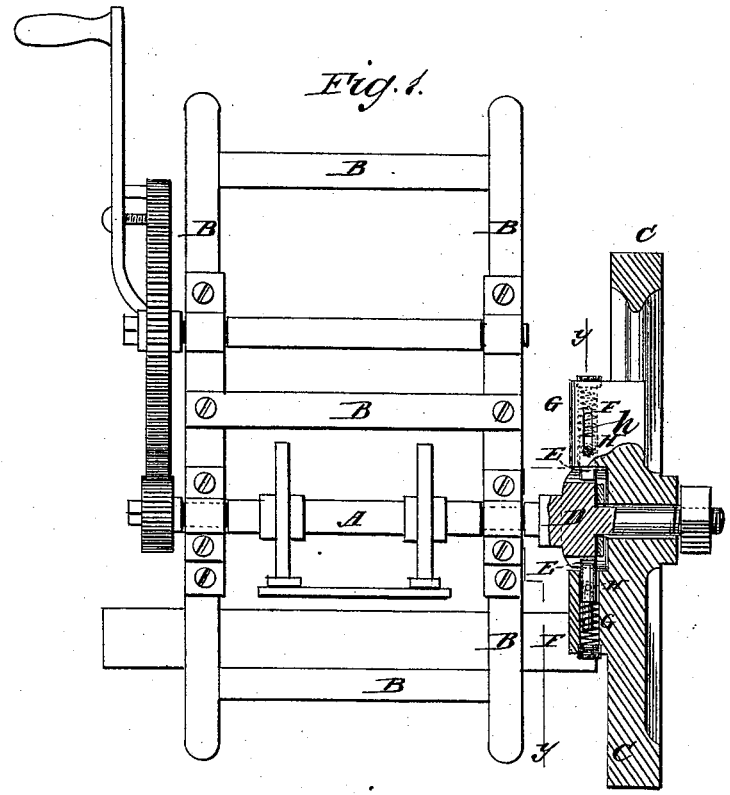
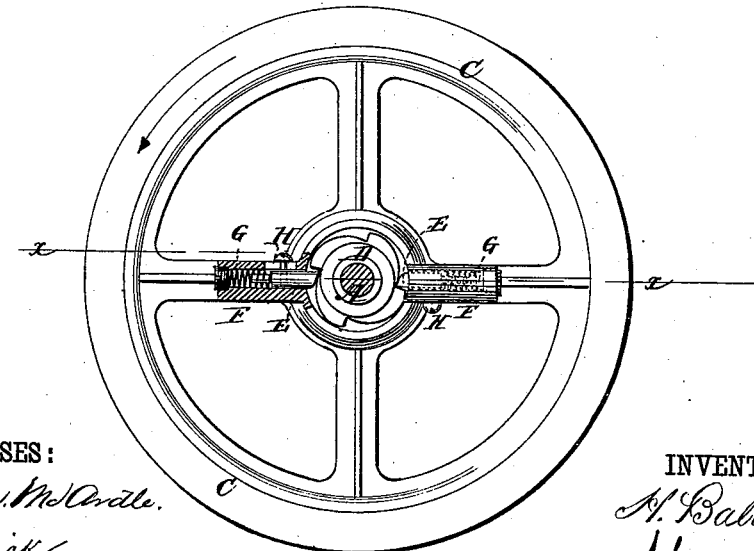

UNITED STATES PATENT OFFICE.

HERMAN BALDWIN, OF NEW HAVEN, CONNECTICUT.

IMPROVEMENT IN FLY-WHEELS.

Specification forming part of Letters Patent No. 211,685, dated January 28, 1879; application filed May 21, 1878.

*To all whom it may concern:*

Be it known that I, HERMAN BALDWIN, of New Haven, in the county of New Haven and State of Connecticut, have invented a new and useful Improvement in Safety Fly-Wheels, of which the following is a specification:

Figure 1 is a top view, partly in section, through the line $x\ x$, of the shaft to which my improved fly-wheel has been applied. Fig. 2 is a side view of the fly-wheel, partly in section, through the line $y\ y$, Fig. 1.

Similar letters of reference indicate corresponding parts.

The object of this invention is to furnish fly-wheels for fodder-cutters and other machines which shall be so constructed that should the shaft to which it is applied be suddenly stopped, the fly-wheel will continue its motion until its momentum has been exhausted, so as to prevent the machinery to which it is applied from being broken.

The invention consists in the combination of the ratchet collar or wheel, the pawls, the springs, and the sockets with the shaft and the fly-wheel placed upon the said shaft, as hereinafter fully described.

A represents a shaft, which revolves in bearings attached to the frame-work B, and which may be the shaft of a fodder-cutter, or any other machine requiring the use of a fly-wheel. C is a fly-wheel, which is placed upon a journal of the shaft A, and secured in place by a nut or other suitable means.

Upon the shaft A, at the inner side of the fly-wheel C, is formed, or to it is attached, a collar or wheel, D, having teeth formed in its face.

The teeth of the ratchet-wheel D are made with straight shoulders, and curve gradually from the top of said shoulders to the base of the shoulders of the next teeth, as shown in Fig. 2, so that the pawls E may readily pass over the said teeth in one direction, but not in the other. Four (more or less) teeth may be formed upon the wheel D, as may be desired.

The pawls E are placed in sockets F, formed upon or attached to the spokes of the fly-wheel C, and are held down against the wheel D by coiled springs G, placed in the outer parts of the said sockets F.

The pawls E are kept from turning in the sockets F, and their movements within said sockets are limited, by screws H, which pass in through short longitudinal slots $h$ in the said sockets and screw into the said pawls.

With this construction, when the shaft A is turned forward, the shoulders of the teeth of the ratchet-wheel D bear against the sides of the inner ends of the pawls E, so that the said shaft A may carry the fly-wheel C with it in its revolution. With this construction, should the shaft A be suddenly stopped, the fly-wheel C will continue its revolution, the pawls E sliding over the teeth of the wheel or collar D, so that the machinery with which said shaft and fly-wheel are connected may be kept from being broken by the momentum of the said wheel C.

If desired, a washer may be interposed between the shoulder of the collar or ratchet-wheel D and the fly-wheel C, as shown in Fig. 1.

I am aware that, broadly, a band or fly wheel connected to its shaft by a spring pawl or latch engaging with a ratchet on said shaft, by which, when the motion of the latter is arrested, the wheel may continue to revolve until the force of its momentum is spent, is old.

What I claim, and desire to secure by Letters Patent of the United States, is—

The combination, with the shaft A, having the ratchet D, of the wheel C, having the box or socket F, supplied with a spring-pawl, E, and pawl-holding screw or stud H, playing in a slot, $h$, in the box or socket F, substantially as shown and described, for the purpose set forth.

HERMAN BALDWIN.

Witnesses:
JULIUS TWISS,
ALVAN M. HOLMES.